US005918017A

United States Patent [19]

Attanasio et al.

[11] Patent Number: 5,918,017

[45] Date of Patent: Jun. 29, 1999

[54] SYSTEM AND METHOD FOR PROVIDING DYNAMICALLY ALTERABLE COMPUTER CLUSTERS FOR MESSAGE ROUTING

[75] Inventors: Clement Richard Attanasio, Peekskill; German Sergio Goldszmidt, Dobbs Ferry; Guerney Douglas Holloway Hunt, Wappingers Falls; Stephen Edwin Smith, Mahopac, all of N.Y.

[73] Assignee: Internatioinal Business Machines Corp., Armonk, N.Y.

[21] Appl. No.: 08/701,939

[22] Filed: Aug. 23, 1996

[51] Int. Cl.[6] .......... G06F 3/00

[52] U.S. Cl. .......... 395/200.54; 395/200.69; 395/200.72

[58] Field of Search .......... 395/200.31, 674, 395/675, 729, 730, 731, 200.69, 200.72, 200.73, 182.09, 182.11, 200.54, 200.51; 370/221, 222

[56] References Cited

U.S. PATENT DOCUMENTS

| | | | |
|---|---|---|---|
| 4,112,488 | 9/1978 | Smith, III | 395/200.69 |
| 5,261,096 | 11/1993 | Howarth | 395/200.73 |
| 5,353,412 | 10/1994 | Douglas et al. | 395/200.73 |
| 5,357,632 | 10/1994 | Pian et al. | 395/675 |
| 5,371,852 | 12/1994 | Attanasio et al. | 395/200.54 |
| 5,459,864 | 10/1995 | Brent et al. | 395/675 |
| 5,515,509 | 5/1996 | Rom | 395/200.69 |
| 5,539,883 | 7/1996 | Allon et al. | 395/675 |
| 5,675,736 | 10/1997 | Brady et al. | 395/200.69 |

OTHER PUBLICATIONS

Cisco Internet Solutions, LocalDirector, "More Information About LocalDirector" Jun. 18, 1996.

*Primary Examiner*—Nabil Hindi
*Attorney, Agent, or Firm*—Richard M. Ludwin; Anne V. Dougherty; Kevin M. Jordan

[57] ABSTRACT

A TCP-connection-router performs encapsulated clustering by dividing each encapsulated cluster into several Virtual EC (VECs), dynamically distributing incoming connections within a VEC based on current server load metrics according to a configurable policy. In one embodiment, the connection router supports dynamic configuration of the cluster, and enables transparent recovery which provides uninterrupted service to the VEC clients.

11 Claims, 12 Drawing Sheets

100
REMOTE HOST
REMOTE HOST
REMOTE HOST
130
130
130
120
120
140
EXTERNAL INTERNET NETWORK 120
GATEWAY
109
PORT
PORT
PORT
PORT
160
160
160
160
140
MESSAGE SWITCH
140
ROUTING FUNCTION
150
140
INTERCONNECT
110
105
106
107
108
170

REMOTE HOST
130
125
120
109
MESSAGE SWITCH
PORT
200
MESSAGE SWITCH TABLE
212
214
216
210
218
215
PORT
PROTO
NODE
FUNCTION
P1
PR1
0
F_1
P2
PR2
0
F_2
P3
PR3
N1
0
PN
PRN
0
F_N
ROUTING FUNCTIONS
F_1
F_2
F_N
110
INTERCONNECT
105
NODE 1
106
NODE 2

370
105
106
107
108
INTERCONNECT
110
109
GATEWAY
300
TCP-CONNECTION-ROUTER
320
MANAGER
346
344
340
EXECUTOR
310
VEC ROUTER
VECs
140
MESSAGE SWITCH
130
REMOTE HOST
130
REMOTE HOST
360
130
REMOTE HOST
350
120

348
130
REMOTE HOST
130
REMOTE HOST
350
VIRTUAL ENCAPSULATED CLUSTER
109
GATEWAY
320
MANAGER
344
346
350
340
342
EXECUTOR
310
VEC ROUTER
140
MESSAGE SWITCH
105
106
107
348
120
108

340
EXECUTOR
344
346
140
MESSAGE SWITCH
310
VEC ROUTER
540
510
CONNECTION TABLE
VEC TABLE
550
PORT TABLE
520
EXECUTOR INTERFACE
SERVER TABLE
530

600
REMOTE HOST
130
REMOTE HOST
130
REMOTE HOST
130
GATEWAY
109
300
MANAGER
320
620
622
624
650
654
610
630
634
640
644
346
344
EXECUTOR
340
632
632
642
646
EXTERNAL INTERNET NETWORK
120
105
635
106
635
170
107
170
108
170

310
702
WAIT FOR PACKET
706
704
NO
EXISTING CONNECTION?
YES
708
NO
FIN, SYN, OR RST?
YES
710
RST?
NO
714
SYN?
YES
716
ESTABLISH CONNECTION
NO
YES
712
RESET CONNECTION
718
FIN?
YES
NO
720
MOVE CONNECTION TO FIN STATE
722
FORWARD PACKET

VEC TABLE 550
ADR. 1
ADR. 2
ADR. 3
ADR. N
PORT TABLE 520
802
804
806
808
PORT 1
PORT 2
PORT 3
PORT N
STALE TIMEOUT
FIN TIMEOUT
ATTRS.
NODE TABLE 530
NUMBER OF NODES
LAST CHOSEN NODE
ELLIGIBLE WEIGHT
MAX WEIGHT
WEIGHT BOUND
810
812
814
816
818
NODE 1
NODE 2
NODE N
WEIGHT
NODE INFO.
820
822
830

910
WAIT FOR EVENT MESSAGE/TIMEOUT
EXECUTOR TIMEOUT
930
QUERY EXECUTOR
EVENT?
920
PARAMETERS
UPDATE PARAMETERS
928
METRICS
935
GET EXECUTOR COUNTERS
925
GET METRICS
940
COMPUTE CURRENT PROPORTIONS
950
COMPUTE NEW WEIGHTS
960
WEIGHTS CHANGE > THRESHOLD?
NO
YES
970
TELL EXECUTOR OF NEW WEIGHTS 120
1050
320
340
1020
MANAGER
EXECUTOR
RECOVERY
1030
320
340
1020
MANAGER
EXECUTOR
RECOVERY
110
1010
107
1010
107
1010
107

SYSTEM AND METHOD FOR PROVIDING DYNAMICALLY ALTERABLE COMPUTER CLUSTERS FOR MESSAGE ROUTING

I. BACKGROUND OF THE INVENTION a. Field of the Invention

This invention relates to the field of networked computing. More specifically, the invention relates to the clustering of computers to support a set of remote services.

b. Related Art

An Encapsulated Cluster (EC) is characterized by a Connection-Router (CR) node and multiple server hosts providing a set of services (e.g. Web service, NFS, etc.). An example of a system which provides encapsulated clustering is described in U.S. Pat. No. 5,371,852, entitled "METHOD AND APPARATUS FOR MAKING A CLUSTER OF COMPUTERS APPEAR AS A SINGLE HOST ON A COMPUTER NETWORK".

Remote clients request services from the EC using protocols based, for example, on TCP/IP (e.g. HTTP). The service time for each request varies depending on the type of service, and the availability of the corresponding server applications. Hence, a naive allocation of connections quickly creates a skewed allocation that under utilizes the available EC resources, and introduces unnecessary delay to the requests.

The prior art has shown that there are many performance problems relating to scaling servers. See, for example, NCSA's World Wide Web Server: Design and Performance, IEEE Computer, Volume 28, Number 11, November 1995, Pages 68–74. Consider an EC which uses round-robin DNS to support Web servers (i.e. httpd demons). The servers provide access services to video streams, database queries, and static web pages via http. The service time for each type of request varies widely depending on the type of services being provided, and the actual content involved. For instance, a complex database query could take orders of magnitude more time than providing a static, pre-loaded HTML page. This imbalance in request processing time often causes skewed utilization of the server cluster. Related problems with round-robin DNS are described in User Access Paterns to NCSA's Worldwide Web Server, Kwa et al, Technical Report UIUCDSD-R-95-1394, Department of Computer Science, University of Illinois Urbana-Champaign, February 1995).

The prior art has shown that there is a need for dynamic allocation of resources. See, for example, Evaluating Management Decisions via Delegation, German Goldszmidt and Yechiam Yemeni, The Third International Symposium on Integrated Network Management, San Francisco, Calif., April 1993. An EC provides a single system image of a collection of services, typically over a collection of hosts. However, actual installations may require that services be allocated according to specific user policies, which can be dynamic. For example, a specific subset of the hosts may be allocated for secure transactions on a merchant Web server, while video on demand services is supported by another subset of hosts which include specialized hardware.

II. SUMMARY OF THE INVENTION

An object of this invention is to improve the overall throughput of an Encapsulated Cluster.

Another object of this invention is to reduce the aggregate delay of the remote service requests.

A further object of this invention is to provide means for a designated node to take over the operation of a failed connection-router in such a way that network clients experience no interruption of service.

In accordance with a first aspect of the present invention an Encapsulated Cluster (EC) is characterized by a Gateway node and server hosts. The gateway node (1) divides an EC into several Virtual EC (VECS), (2) dynamically distributes incoming connections within a VEC based on current server load metrics according to a configurable policy and (3) supports dynamic configuration of the cluster.

In accordance with a second aspect of the present invention a system and method are provided to enable transparent recovery from the failure of a gateway node in order to provide uninterrupted service to the clients. In accordance with the method, each node in a cluster or VEC maintains a copy of a subset of state information held at the gateway. When the gateway fails, the state information is transferred to a backup gateway.

In a preferred embodiment, the EC can appear as (1) a VEC (a single IP address for all the remote clients) or (2) as multiple VECs (aliasing several IP addresses.) The TCP-CR node owns these IP addresses and receives all their TCP connection requests. Each IP address is associated with a VEC. The TCP-CR distributes new TCP connections to hosts within each VEC according to the weights associated with the VEC. The TCP-CR supports dynamic configuration that allows: Dynamic definition of VECS. Dynamic configuration of the weights associated with a VEC. Automatic or manual management of VECS (adding or removing hosts, services, etc.). This solution allows for dynamic configuration, addition and removal of server hosts, while avoiding the problem of cached server names in the network.

III. BRIEF DESCRIPTION OF DRAWINGS

IV. DETAILED DESCRIPTION OF THE INVENTION

1. OVERVIEW

Figure 1:
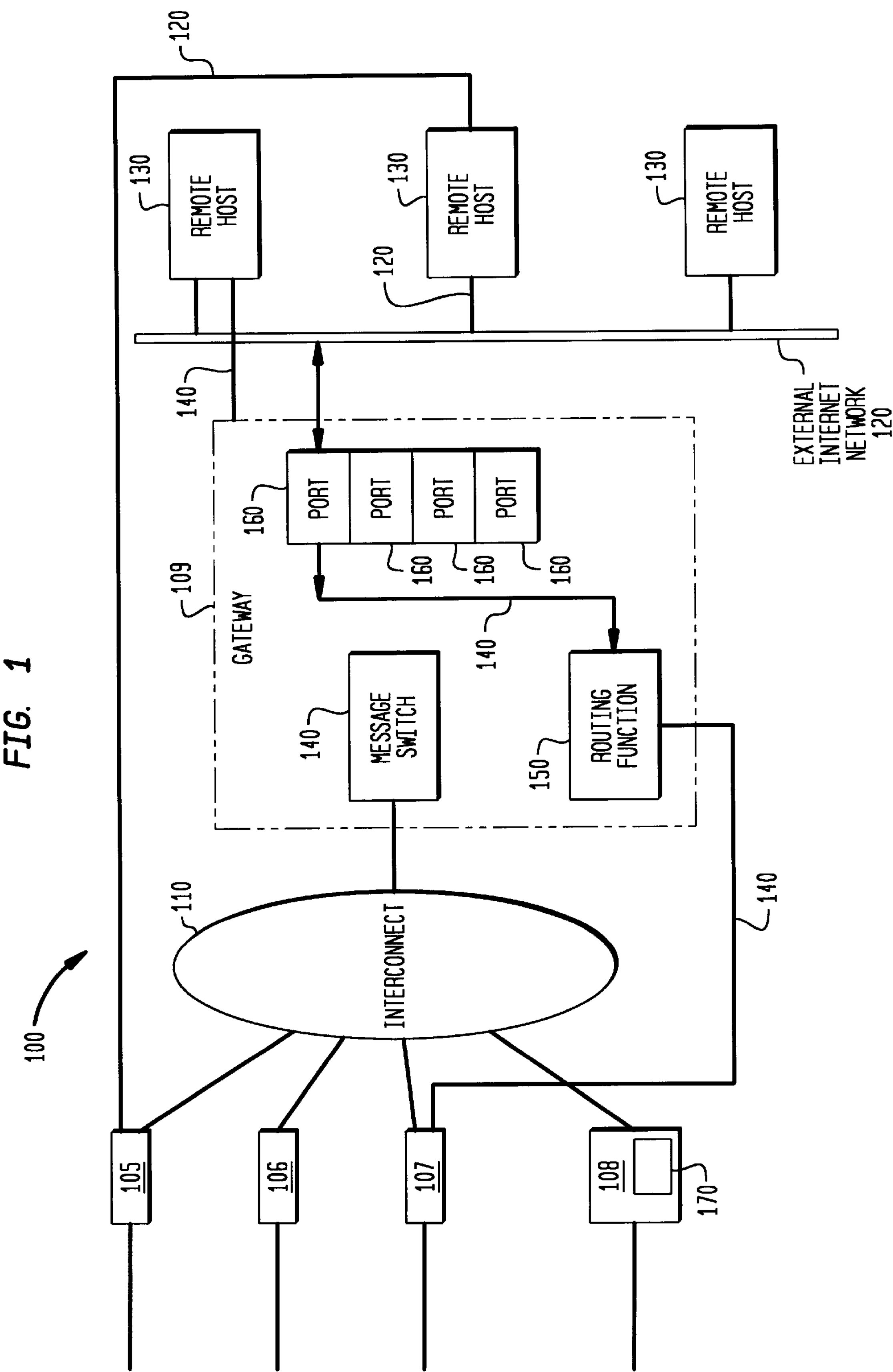
FIG. 1 shows a prior art encapsulated cluster system.
Figure 2:
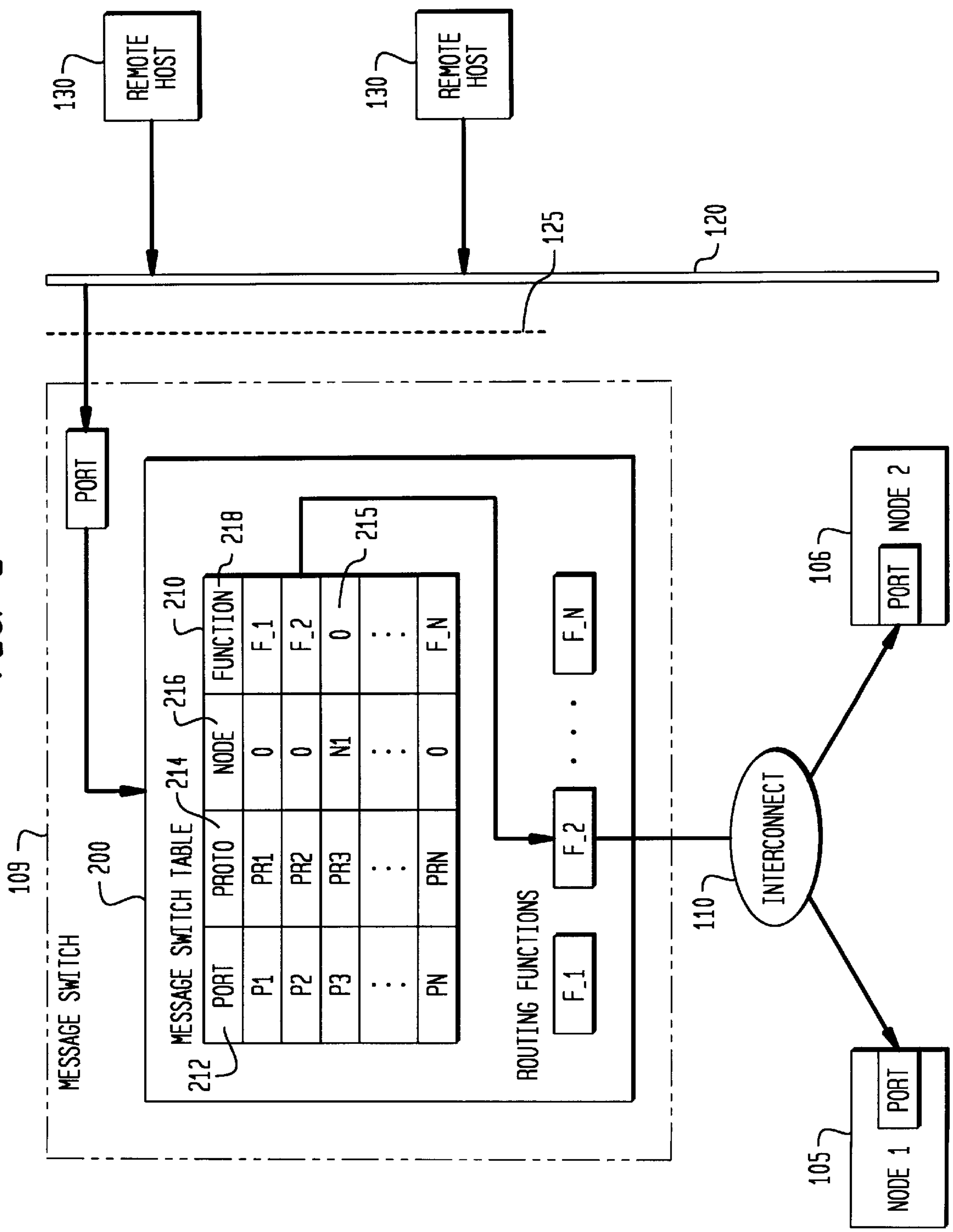
FIG. 2 shows a prior art message switch.

This present virtual encapsulated cluster system can be embodied as an improvement to U.S. Pat. No. 5,371,852. U.S. Pat. No. 5,371,852, entitled "METHOD AND APPARATUS FOR MAKING A CLUSTER OF COMPUTERS APPEAR AS A SINGLE HOST ON A NETWORK" (Ser. No. 960,742; filed Oct. 14, 1992; assigned to the same assignee as the present invention) is incorporated by reference herein as if printed in full below. FIG. 1 shows an embodiment of the encapsulated cluster invention of U.S. Pat. No. 5,371,852. Like the system of U.S. Pat. No. 5,371,852, the present system routes TCP information that crosses the boundary of a computer cluster. The information is in the form of port type messages. Incoming messages are routed and the servers respond so that each cluster appears as a single computer image to the external host. In the present system a cluster is divided into a number of virtual clusters (virtual encapsulated clusters). Each virtual encapsulated cluster appears as a single host to other hosts on the network which are outside the cluster. The messages are routed to members of each virtual encapsulated cluster in a way that keeps the load balanced among the set of cluster nodes.

Figure 3:
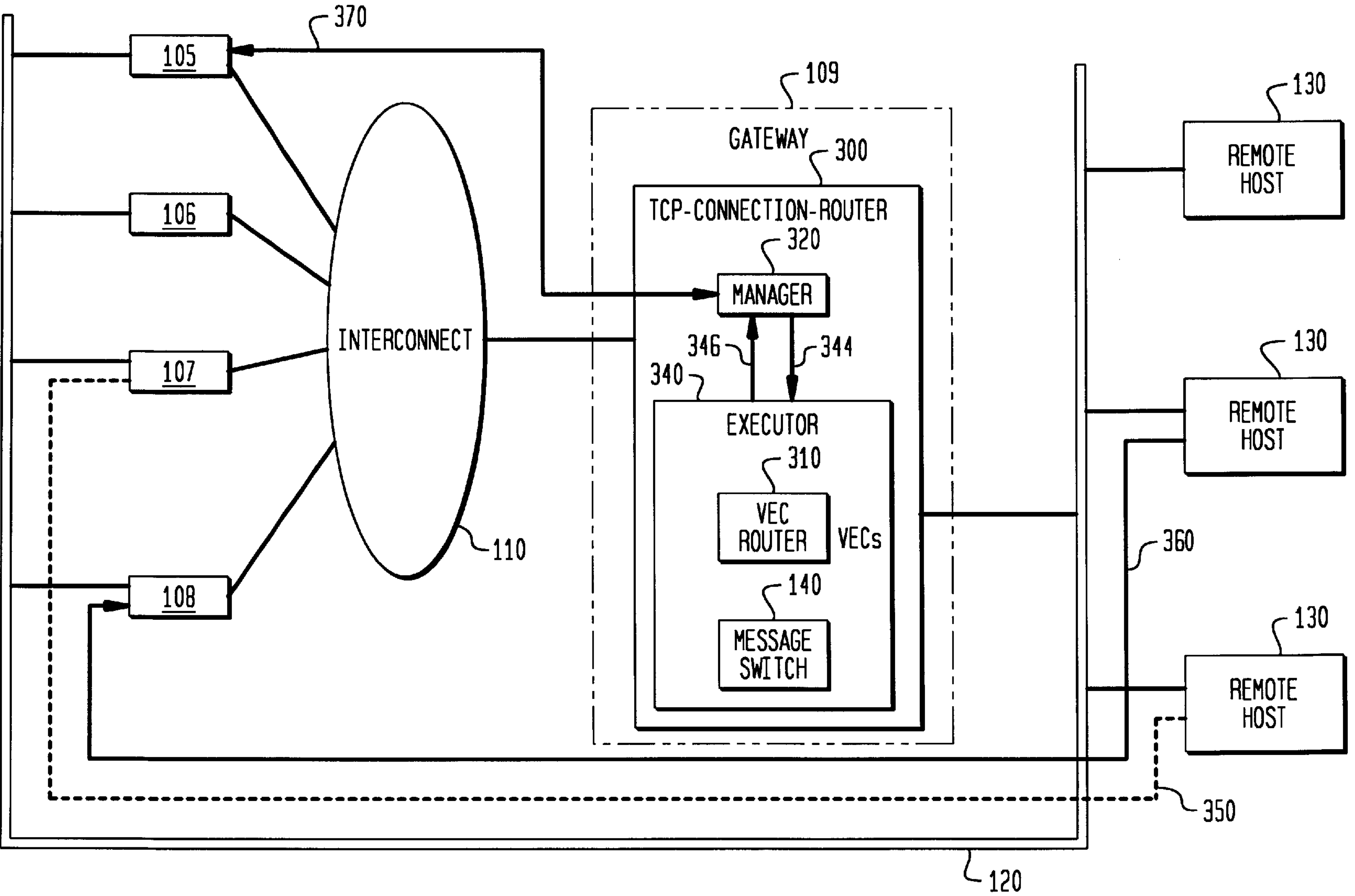
FIG. 3 shows a virtual encapsulated cluster system according to an embodiment of the present invention.

FIG. 3 shows an embodiment of a Connection Router for the TCP family of protocols, the TCP-Connection-Router (TCP-CR) 300. The apparatus comprises two or more computer nodes (105–109) connected together by a communication link, called an interconnect 110, to form a cluster. (Note that in one embodiment of the invention, the interconnect can be a network.) One of the computers in the cluster, serving as a gateway 109, is connected to one or more external computers and/or clusters (hosts) through another communication link called a network 120. A gateway can be connected to more than one network and more than one node in the cluster can be a gateway. Each gateway connection to a network, i.e., boundary, can have multiple addresses on the network. Each gateway has a TCP-Connection-Router (TCP-CR) 300 which consists of a Manager 320 and an Executor 340 and an optional Recovery Manager as described in FIG. 10. The Manager controls the routing by sending command requests 344 to the Executor and evaluating the responses 346. The Executor consists of a message switch 140 similar to that of U.S. Pat. No. 5,371,852, and a VEC router 310.

Figure 4:
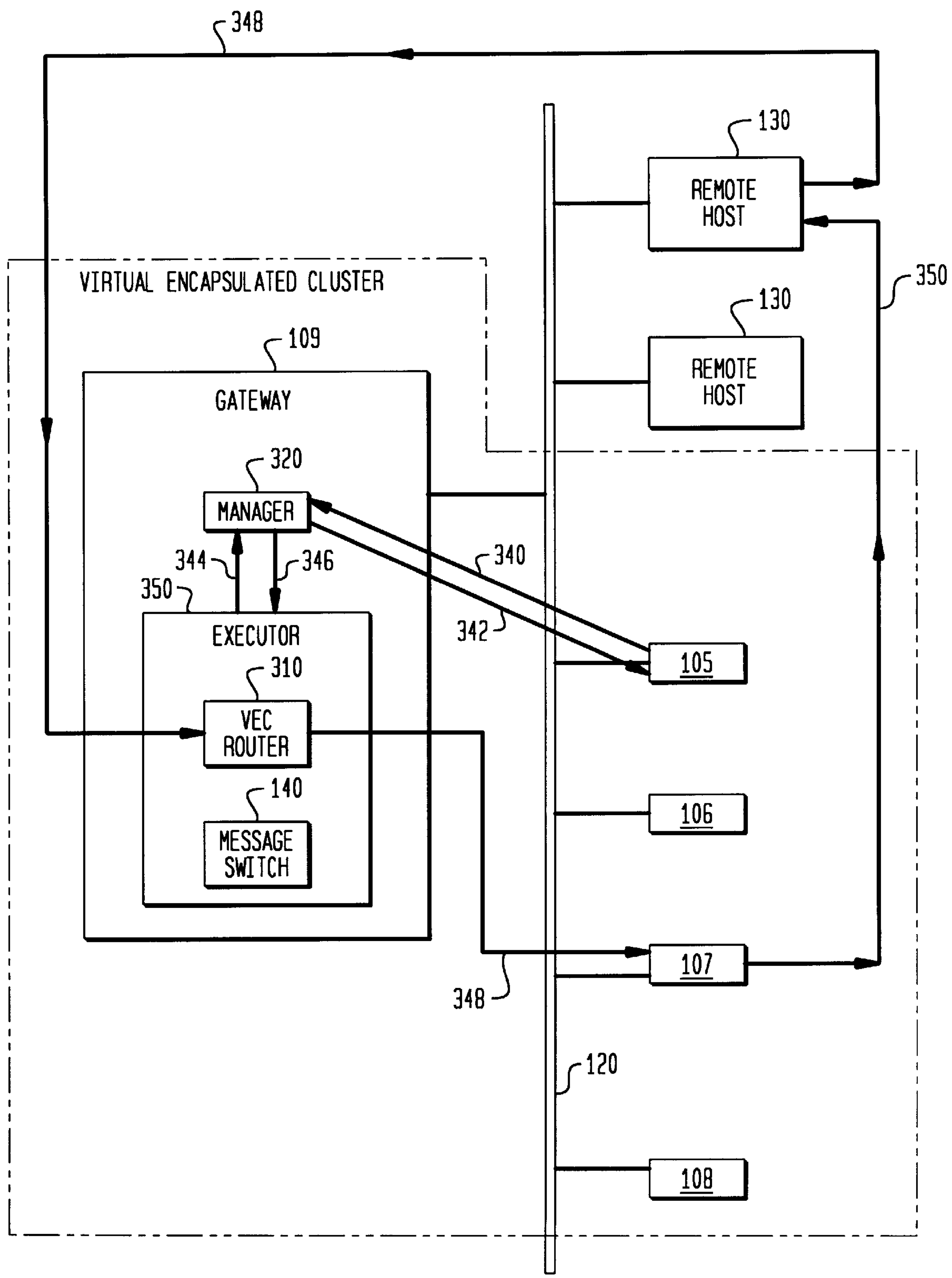
FIG. 4 Shows a virtual encapsulated cluster system according to an alternative embodiment of the present invention.

FIG. 4 shows an alternate embodiment of the present invention. As in the preferred embodiment, the nodes 107 of the cluster communicate their responses directly back to the clients 130. However, in this embodiment there is no dedicated interconnect 110 (as shown in FIG. 3), all cluster nodes are connected by the external network 120. The TCP-Connection-router remains the same. A sample request 348 goes from a client 130 through the Gateway 109 and onto a cluster node 107 via the external network 120. The corresponding response 350 goes directly from node 107, to the client 130 via the external network 120.

The Manager 320 component implements connection allocation policies and enables dynamic configuration of the virtual encapsulated clusters. The Manager monitors and evaluates the current load on the members of each encapsulated cluster via a dynamic feedback control loop. The Manager implements connection allocation policies that perform intelligent spreading of incoming connections across the virtual encapsulated cluster servers to speed up the service of client requests. The new weight assignments are computed via a Manager algorithm that can be configured by the cluster administrators. The inputs of this decision algorithm for weights assignment include evaluated load metrics, and administrator configurable parameters such as time thresholds. Incoming connections are dynamically allocated to each VEC based on the above inputs ensuring that the cluster resources are allocated to provide fastest service to the clients. The Manager also includes a command interface which is used by administrators to dynamically configure the virtual encapsulated clusters. A more detailed description of the Manager is presented in Section 3.

If the TCP-connection-router node 109 should cease to operate, all the nodes of the cluster will be unable to provide service to their remote clients. To address this problem we add a Recovery Manager which becomes active in the designated backup Gateway node when a functioning Gateway fails, and enhance the server nodes to keep recovery data. Clients need not take any action to recover from a Gateway failure, and continue to receive uninterrupted service from the cluster. A more detailed description of the Recovery Manager is presented in Section 4.

2. THE EXECUTOR

Figure 5:
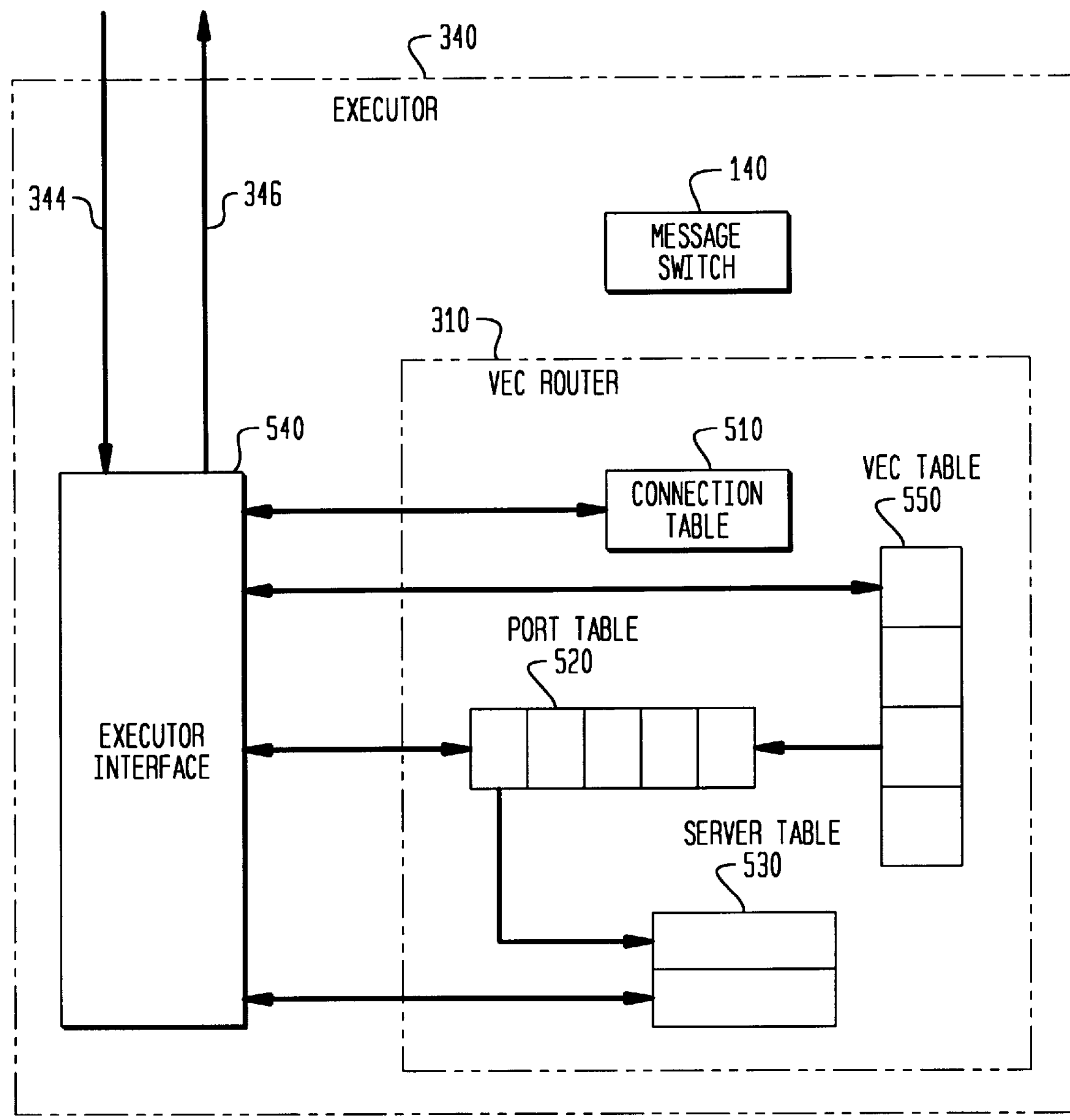
FIG. 5 is a more detailed diagram of the executor of FIGS. 3 and 4.

FIG. 5 shows the preferred embodiment of the executor 340. The executor consists of a command processor 540, message switch 140, and VEC router 310. The command processor 540 receives request for the executor 340 and returns responses 346. The command processor interacts with the message switch 140 and VEC router 310 to preform request and construct responses. The command processor may affect the connection table 510, VEC table 550, port table 520 or server table 530. The message switch 140 and connection table 510 are the same as the message switch and connection table of U.S. Pat. No. 5,371,852. In the preferred embodiment this invention the VEC router 310 does not modify incoming packets. Packets are forwarded to servers which have been configured so that responses will be sent directly to the clients from the internal nodes.

The message switch 140 is essentially the same as the message switch in U.S. Pat. No. 5,371,852. However, because of the present invention the message switch in the preferred embodiment has been optimized and an additional check has been added to the message switch. The message switch must check to see if the message is for a VEC known to the VEC router.

The VEC router keeps a set of addresses which represent each VEC to clients on the external network. The VEC router forwards requests to internal nodes of the cluster without modifying the received request. Each internal node of the cluster is associated wit one or more VES and only receives requests for VECs which it is associate with. Using techniques known to the art, in the present invention the internal nodes are configured to accept packets sent to the address representing a VEC and reply directly to the clients. In the prior art the message switch 140 had to rewrite packet headers for incoming request (FIG. 1 140) and rewrite packet headers for responses (FIG. 1 120) to request. In the present invention rewriting packet headers is not necessary. (The prior art can be used with the present invention.) The performance of the present invention is better than the prior art because packet headers are not rewritten and the response packets do not flow through the gateway node 109. Because response packets do not flow through the TCP-Connection-router the message switch does not receive any response packets from nodes internal to the cluster. As a result in the preferred embodiment the header rewriting has been eliminated and checking for response packets from internal nodes has been eliminated.

A direct consequence of this improvement is that the VEC router only sees one half of the flows between the client and the internal node providing services. This makes it difficult to maintain an accurate connection table. To solve this problem the present invention uses two new timers specific to its connection table a stale timeout and a FIN timeout. Using these two timers and communication flows and timers known to the art, the connection table can be accurately maintained.

Connection table entries are considered to be in one of two states ACTIVE or FIN. Whenever a new connection is established a connection table entry is created and placed in the active state. Whenever a packet flows on a connection for which there is an entry in the connection table the connection entry is time stamped. When the VEC router seen a FIN flow from the client to the node providing services, the associated connection table entry is placed in the FIN state. (Packets may continue to flow on connections placed in FIN state.) A connection table entry is considered closed and available for purging when the amount of time identified by the FIN time out has expired since the last packet was forwarded from the client to the server on that connection. If the client fails without sending a FIN the connection record entry remains. The stale timeout specifies how long to wait after the last packet has flowed on an active conversation before purging the connection table entry.

Figure 7A:
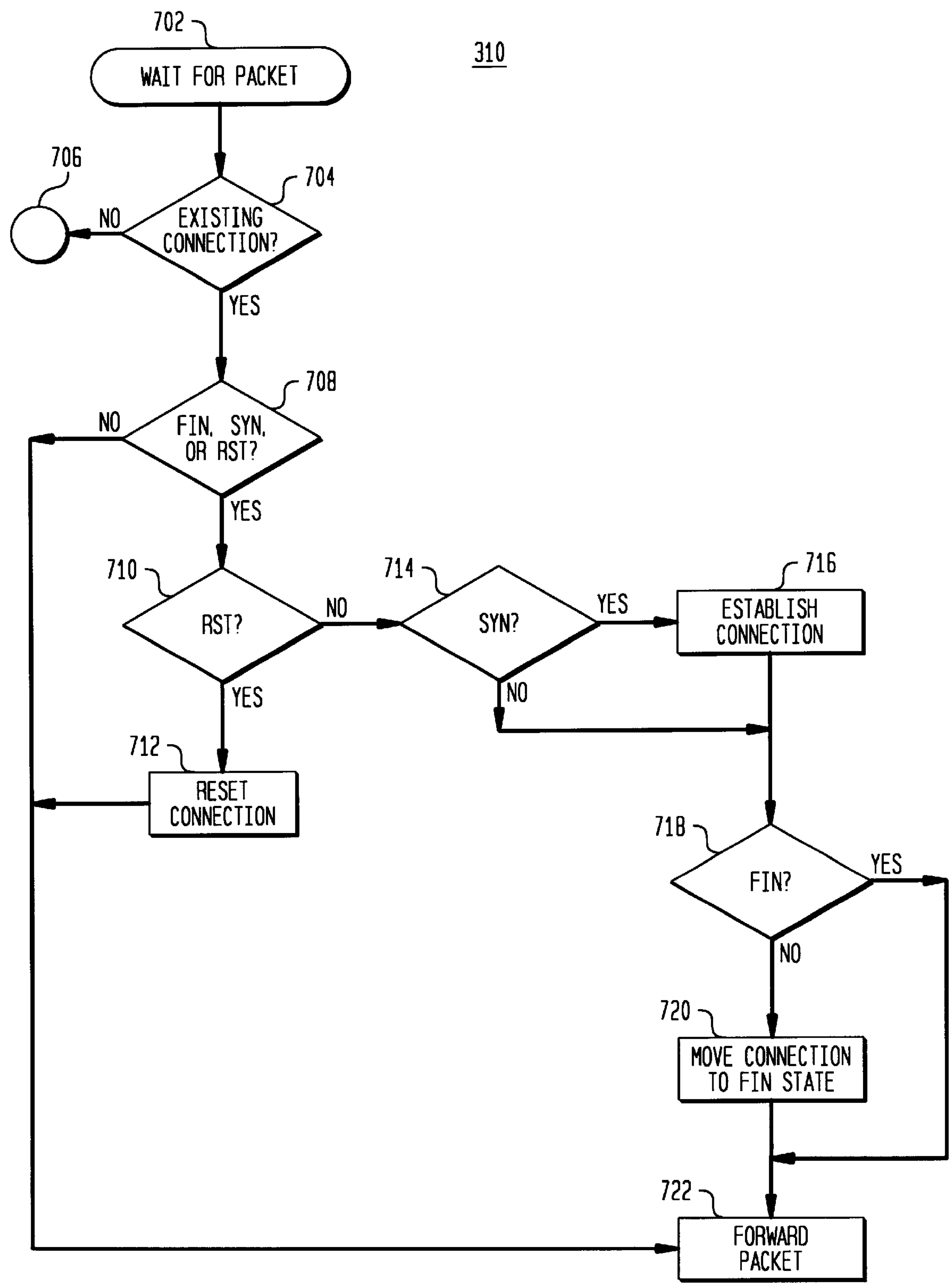
FIGS. 7A–7C are a flow chart of the executor.
Figure 7B:
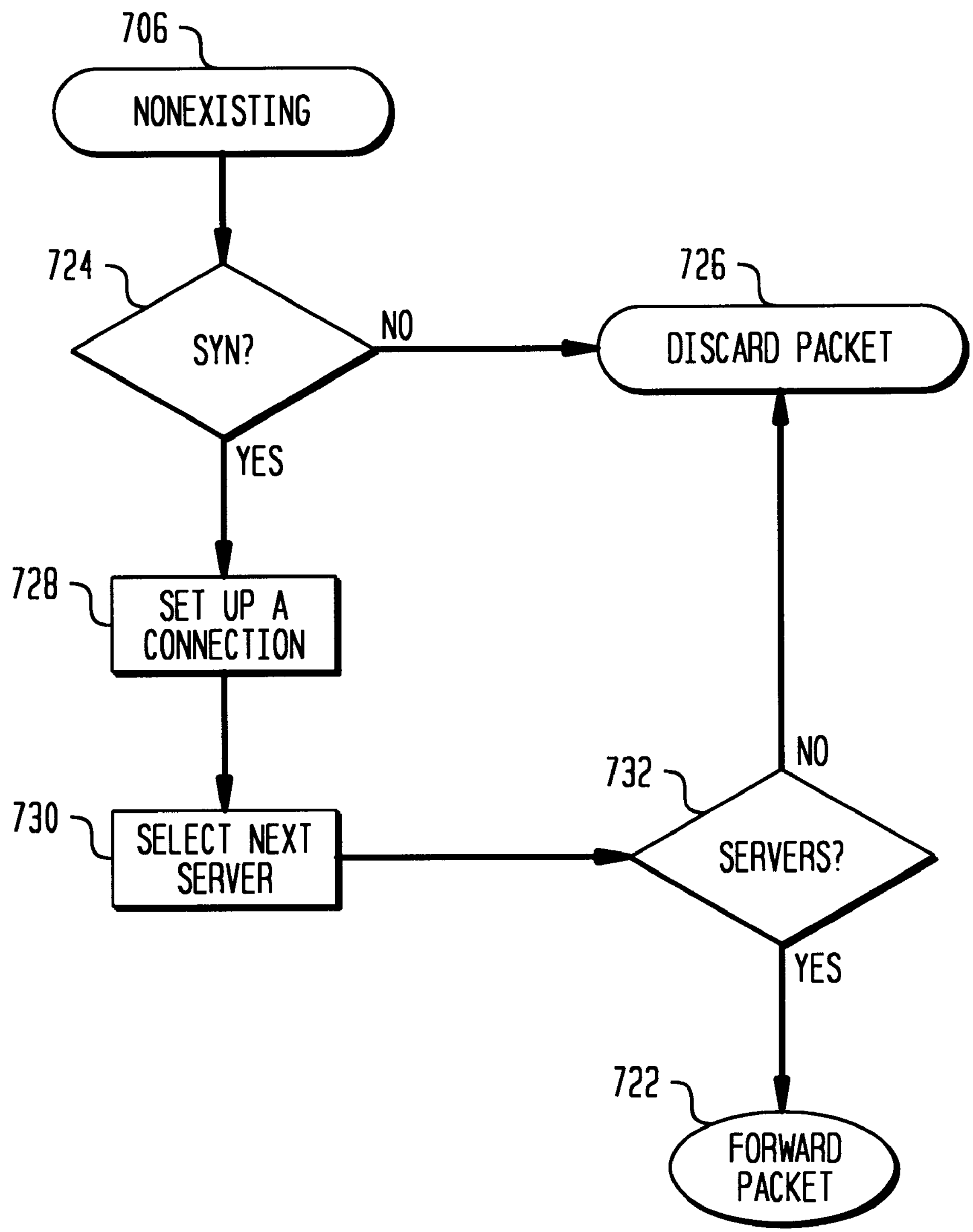
Figure 7C:
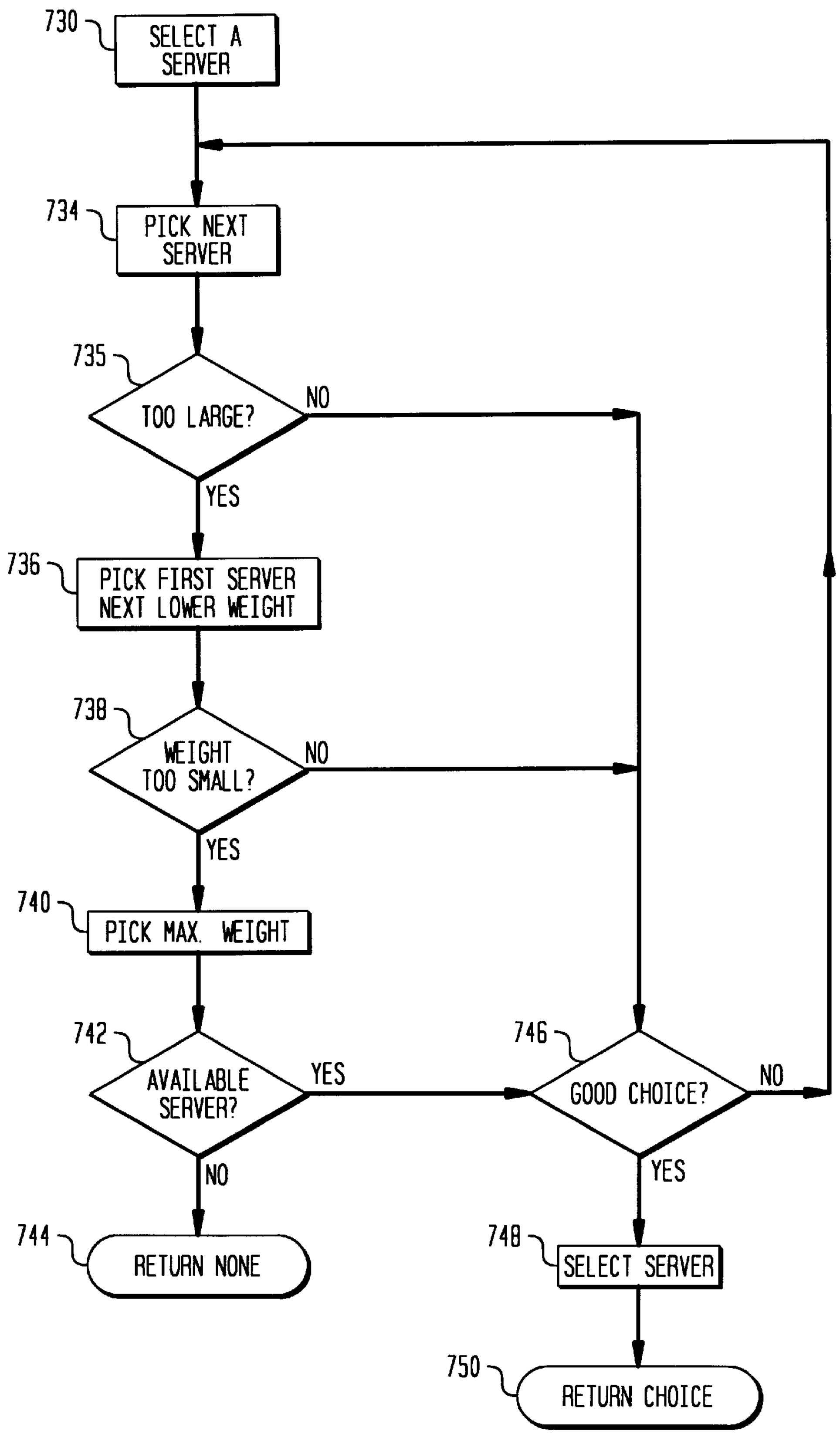

FIGS. 7A–7C show the flow chart of the VEC router 310. In FIG. 7A the VEC router waits for a packet 702. When a packet is received the VEC router checks 704 whether the packet is for an existing TCP connection or is for a new TCP connection. If the packet is for an existing TCP connection then it checks 708 to see if the packet is a FIN, SYN, or RST (all packet types known to the art). If the packet is not one of these it forwards 722 the packet to the internal node associated with the connection. Otherwise, it checks 710 to see if the packet is an RST. If the packet is a RST, the conversation is purged from the connection table resetting the connection 712 and the packet is forwarded 722 to the internal node that was associated with the connection. If the packet is not an RST the VEC router 310 checks 714 to see if the packet is a SYN. If the packet is a SYN it established the connection 716 which brings the connection into active state even though the connection previously existed. The VEC router 310 then checks 718 to see if the packet is a FIN. If the packet is a FIN the connection is place in FIN state 720. After FIN processing or if the packet was not a FIN it is forwarded to the server associated with the connection 722.

FIG. 7B shows the non existing connection flow chart. When the check 704 finds a non existing connection. The VEC router first checks 724 to see if the packet is a SYN. If the packet is not a SYN it is discarded 726. If the packet is a SYN a connection is set 728 up in active state, a server is selected 730, and the packet is forwarded 722 to the server that was selected.

FIG. 7C shows the flow chart for the process of selecting a server 730 for a new connection. In the present invention this function implements the weighted routing. For the purposes of this discussion of selecting a server, the internal nodes of a VEC are considered to be numbered from one to n. For example if a VEC has seven nodes, the numbers are 1,2,3,4,5,6 and 7. For the purpose of this discussion of selecting a server eligible weights are considered to be numbered from the maximum legal value to one. For example if the max legal value is five the eligible weights would be 5, 4, 3, 2, and 1. Zero is a special value. Weights are also selected in decreasing order. The present invention associates a weight with each internal node providing a specific service. It guarantees for each service that at least one of the nodes has the maximum non zero weight or all of the nodes have zero weight.

The function which selects a server 730 first picks the number corresponding to the next highest server 734 and the current eligible weight. It then checks 735 to see if this number is too large. If the number is not to large it checks 746 to see if the server corresponding to this number is a good choice. (This check will be described more later.) If the number was too large it picks the first server 736 and the next lower weight. It then checks 738 to see if the next lower weight would be zero. If the next lower weight would not be zero it is used instead of the current eligible weight and this function checks 746 to see if the current server is a good choice. After selecting the first server and the maximum weight, this function checks 742 to see if there are any servers available to rout packets to. No servers are available when all of the available nodes have weight zero. If there are no available servers, the packet is returned 744 without selecting a server. If there are servers available this function checks to see if it has a good choice 746. A good choice is defined as a server whose weight is greater than or equal to the current eligible weight. If it is a good choice, the server is selected 748 and returned to the VEC router 750. If it is not a good choice then the algorithm picks the next server 734.

Because the maximum weight is non zero and at least one node has the maximum weight or all the node have zero weight the selecting a server function will always terminate. For the case when there are node with positive weights the function which selects a server distributes packets base on a ratio of the weights. For example between any two internal nodes if one has weight 3 and the other has weight 2, the node with weight 3 will get three packets for every two packets the node with weight 2 receives.

Figure 8:
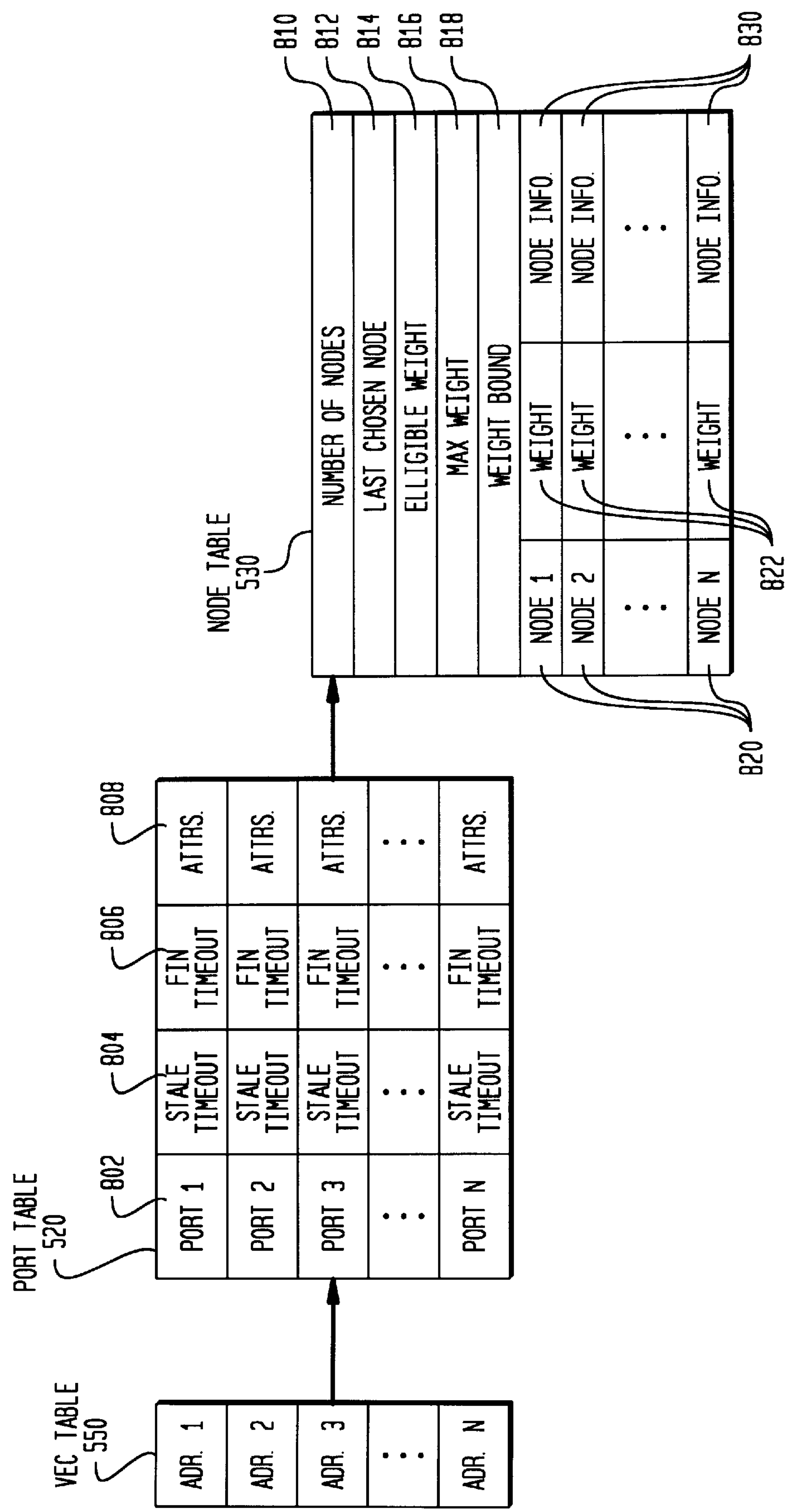
FIG. 8 shows the data structures of the executor.

FIG. 8 shows an embodiment of the data structures used by the VEC router. The VEC table 550, contains the set of addresses which are the VEC addresses on the external network. All parameters which are associated specifically with a VEC are also contained in this table. Each VEC is associated with a port table 520 which contains the set of ports 802 that the VEC is providing service for. Each port entry 802 has associated with it a stale timeout 804, FIN timeout 806 and other port specific attributes 808. Each port has associated with is a subset of the internal nodes of the VEC which are used to provide the services associated with that port. The node table 530 contains addresses of the nodes 820 associate with the port, the current weight 822 associated with this node, and other node specific information 830. (An example of node specific information is counters which indicate the number of connections in active state, the number of connection in FIN state, and the total number of completed connections.) The Node Table 530 also contains the state necessary for the function which selects a server to implementing weighted routing over the set of node in this table. The node table contains the total number of nodes 810, last chosen node 812, current eligible weight 814, maximum weight 816, and weight bound 818. The weight bound is used to limit the variance of the maximum weight. No node is allowed to have a weight greater than the weight bound.

3. THE MANAGER

The Connection-Router-Manager (Manager 320) invention is a method and apparatus for dynamically distributing incoming connections using several load metrics according to a configurable policy. The Manager provides a control loop that dynamically modifies the weights of the Executor 340 routing algorithm to optimize the allocation of cluster resources. The goal of this invention is to improve the overall throughput of the cluster and to reduce the aggregate delay of the service requests, by distributing incoming TCP connections according to the current state of the cluster. Hence, this invention describes a method to distribute the connections to the server hosts that improves the utilization of the servers and reduces the delay of serving the requests.

Figure 6:
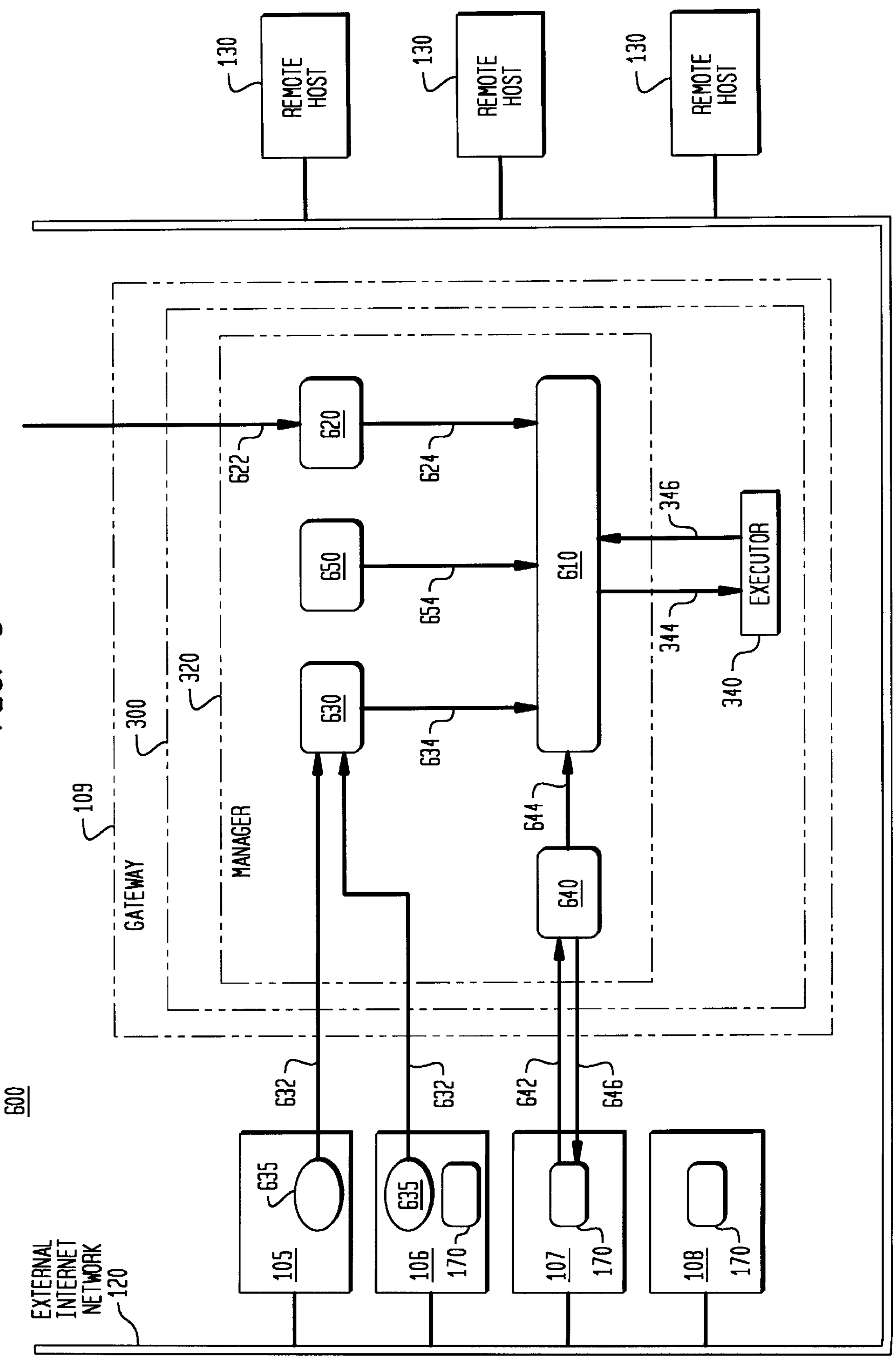
FIG. 6 is a more detailed diagram of the manager of FIGS. 3 and 4.

FIG. 6 shows a sample embodiment of the Manager 320 of the present invention within a cluster 600 of five nodes (105, 106, 107, 108, and 109). FIG. 6 uses the alternative network configuration of FIG. 4, but the configuration of FIG. 3 is also possible. One of the nodes is a gateway 109 which connects to an external network 120 and executes the TCP-Connection-Router 300 (the Executor 340 and the Manager 320). The Manager 320 consists of 5 generic components, a load manager (Mbuddy) 610, an external control interface (Callbuddy) 620, a cluster host metric manager (Hostmonitor) 630, a Forward Metric Generator (FMG) 640, and a User Programmable Metric Manager (UPMM) 650.

Mbuddy 610 can use four different classes of metrics to compute a weights function for the executor: input metrics, host metrics, service metrics, and user metrics. Mbuddy 610 receives these metrics and other relevant information from the Executor interface 346, the Callbuddy interface 624, the Hostmonitor interface 634, the FMG interface 644, and the UPMM interface 654. Mbuddy controls the weights associated with the executor routing algorithm for each VEC port server via interface 344.

Mbuddy 610 will periodically request from the Executor 340 the values of the internal counters associated with each server via interface 346. For example, it will periodically request the values of the counters of the total number of connections established for each server. By substracting two counters of a server polled at times T1 and T2, Mbuddy 610 can compute a metric variable that represents the number of connections received during the time period T1–T2. The aggregation of such input metrics provide an approximation to the characteristic rate of connection requests for each VEC and each port service.

The Hostmonitor 630 will periodically send information to Mbuddy 610 about the state of each host in the cluster via a message interface 634. There are many well known ways for obtaining this state information. For example, the Hostmonitor may use monitoring agents 635 that execute program scripts to evaluate host specific metrics. For example, a script may evaluate the current level of utilization of memory buffers for network connections. If a metric report is not received within a policy-specific threshold time, then the corresponding host metric is given a special value, and the manager may decide that a host is unreachable, and hence no more connection requests are forwarded to it. The Hostmonitor 630 will coordinate the reports of all the monitoring agents and present it to Mbuddy.

The Forward Metric Generator (FMG) 640 produces and evaluates application-specific or service-specific metrics using forward requests, that is, they originate at the Gateway 109 computer. The evaluation consists in producing appropriate requests for each of the cluster host servers and measuring their answering delays. For example, to obtain a forward delay metric on an HTTP server, the FMG may generate an HTTP "GET /" request to each HTTP server in the cluster serving a particular port (e.g. port 80). The FMG 640 will then measure the corresponding delays of servicing the HTTP request and forward a metrics vector to Mbuddy 610. If the request is not answered by a policy-specific threshold time, then the FMG will mark the corresponding service node as temporarily not receiving new requests of the particular service type. This information is used by the manager to decide that a service at a particular host is temporarily unreachable, and hence no more connection requests of this type should be forwarded to it.

The User Programmable Metric Manager (UPMM) 650 allows users of this invention to define arbitrary new metrics to be considered for management of the connections. Such metrics may describe arbitrary policies that any given cluster installation may want to enforce. For example, an arbitrary policy may require that a certain set of cluster hosts should not receive any TCP connections during certain periods of time due to administrative considerations. The UPMM 650 communicates those policies as metrics to Mbuddy via interface 654.

The Callbuddy 620 component enables administrators to dynamically adjust any of the parameters of Mbuddy 610. Callbuddy allows an administrator to configure the algorithm to compute the weight assignment implemented by Mbuddy. For example, administrators may want to dynamically change the weights associated with each of the current metrics. An administrator may, for instance, choose to (1) raise the weight of the host metrics, (2) lower the weight of the service metrics and (3) increase the frequency of polling the Executor 340 for input metrics. The Callbuddy 620 component receives administrator requests via interface 622 and informs Mbuddy 610 via interface 624.

The Mbuddy 610 component is a load manager that establishes a dynamic feedback control loop between the servers and the Connection Router Gateway node. Mbuddy adjusts the weights of the Executor 610 routing algorithm so that servers which are lightly loaded according to the load metrics will receive a larger portion of the incoming TCP connections of their type. Given an arbitrary set of load and policy metrics as defined above, Mbuddy will compute a new relative weight for each server of each port in each VEC, based on its current metrics and its current weight.

The weight assignments are computed for each port on every VEC as follows: (1) Compute all the aggregate metrics (AM) for all the executing servers. (2) Compute all the current weight proportions for each executing server (CWP). (2) For each metric M compute for each server S the metric proportion (MP) of its value (relative to the aggregate AM). (3) For each server compute a new weight NW: (3a) If the server has been quiesced set is NW to 0. (3b) If the server has a sticky weight W use the value of W as the NW. (3c) compute a vector NWV, where each entry NWV[i] is based on a single metric M[i], by the following formula:

$$NWV[i]=AW+[(CWP-MP)/SF]$$

where AW is the average weight in the current range of weights, and SF is a smoothing factor parameter. (3d) Compute the new weight NW of each server as:

$$NW=NWV[1]*W[1]+NWV[2]*W[2]+\ldots+NWV[i]*W[i]$$

Figure 9:
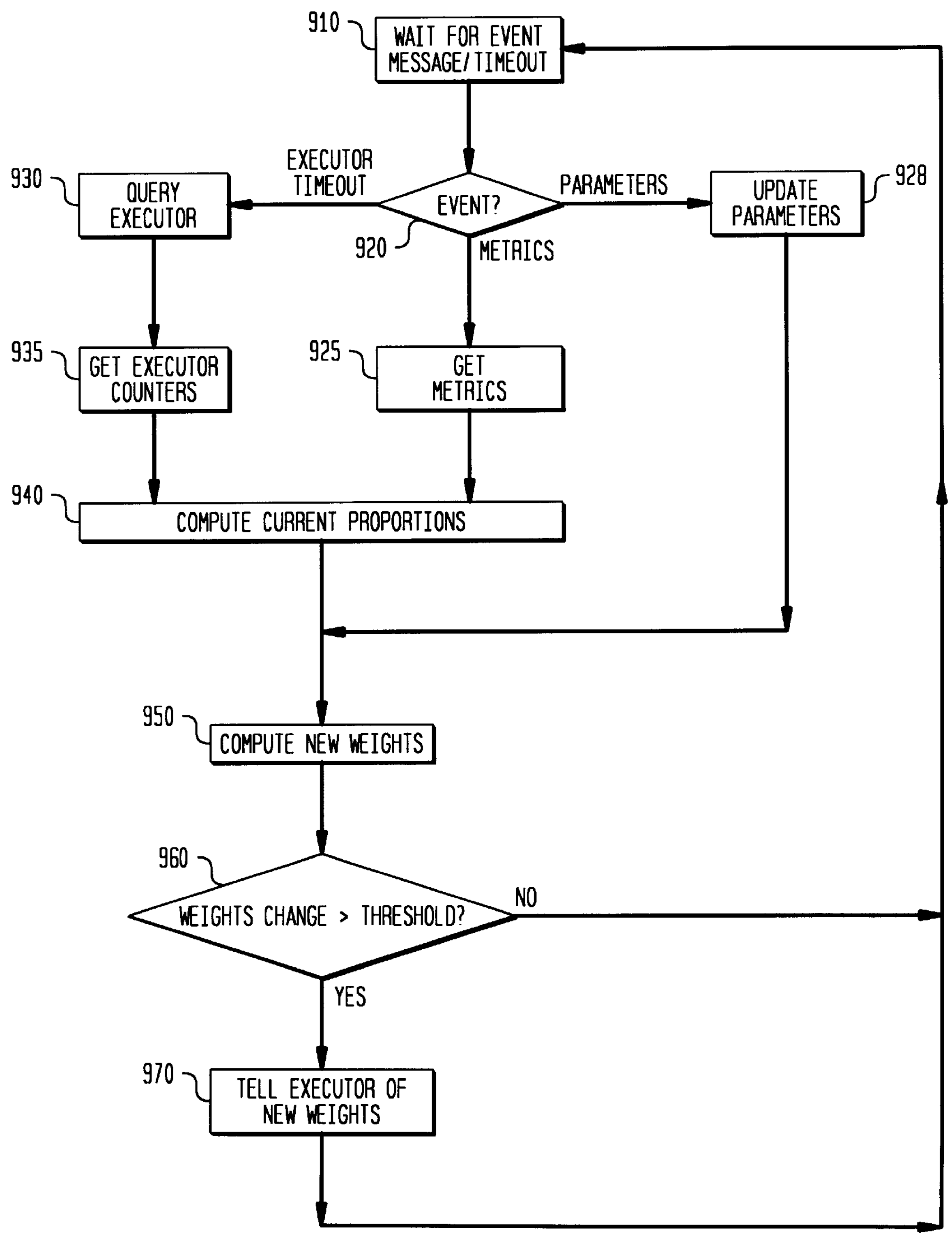
FIG. 9 is a flow chart of the manager.

FIG. 9 is a flowchart description of how the metrics are received by the Manager and the weights assignments are computed by the present invention. Box 910 at the top shows the Manager Mbuddy component waiting for an event which is either a message or a timeout. Decision block 920 determines the type of event that occurred. If there was a timeout that requires refreshing values, then in block 930 the Executor is queried to obtain a set of counter values that provide input metrics (935). If block 920 decides that the event is a request for updating parameters, the corresponding parameters are updated (928). For instance, an administrator may update the weights associated with any metric, or the polling period. If Block 920 determines that the event was the receipt of a metrics update, then in Block 925 the metrics are retrieved and the internal variables are set accordingly. If new metrics have arrived, in Block 940 the algorithm will compute the current proportions of all the metrics and the current weights. Then, in Block 950 the new weights will be computed for each of the server nodes, NW, using the formulas described above. This Block creates a new vector of weights NW[i] where each server i has a weight entry. Decision block 960 determines if the computed new vector of weights NW[i] is different than the current weights vector by an arbitrary threshold function. If the new vector is different, then in Block 970 the executor is informed of the new weights, else the algorithm returns to the TOP state, waiting for a new event.

4. THE RECOVERY MANAGER

Upon detection of a failure of a functioning gateway, the recovery manager in the designated backup gateway becomes active. Failure detection can be done conventionally such as is described in A. Bhide et al., "A highly Available Network File Server", USENIX Conference, Winter 1991, Dallas, Tex., Page 199; or F. Jahanian et al., "Processor Group Membership Protocols: Specification, Design and Implementation", Proceedings of the 12th Symposium of Reliable Distributed Systems, Pages 2–11, Princeton, N.J., October 1993, IEEE Computer Society.

The recovery manager first removes the network connection from the failed Gateway, as is taught in HA/NFS (4), then interrogates all active server nodes to obtain state information from their shadow connection tables, and constructs from this information the connection table in the message switch of the Gateway. The takeover process must complete within the timeout interval of TCP/IP, so that existing connections are not lost. To accomplish this, interior nodes execute a novel hybrid algorithm (described later) to sense when connections have become inactive and remove them from their shadow connection tables, so that only active connections are described to the taking-over Gateway. When all functioning cluster nodes have responded (nodes which do not respond within a specified time interval are assumed to be not functioning), the Recovery Manager executing in the backup Gateway enables its own network interface so as to receive packets addressed to the cluster ip-address. This last step completes the work needed to allow the backup Gateway to be operational.

Relatively static configuration data used by the Manager component is kept in a file shared between primary and backup Gateway, and is read by the backup during takeover.

An obvious but unacceptable alternative solution would be to keep connection information in duplicate at the backup Gateway. This would require a "two-phase" protocol between primary and backup Gateways on each established and terminated connection, and was rejected because of the severe performance cost.

Figure 10:
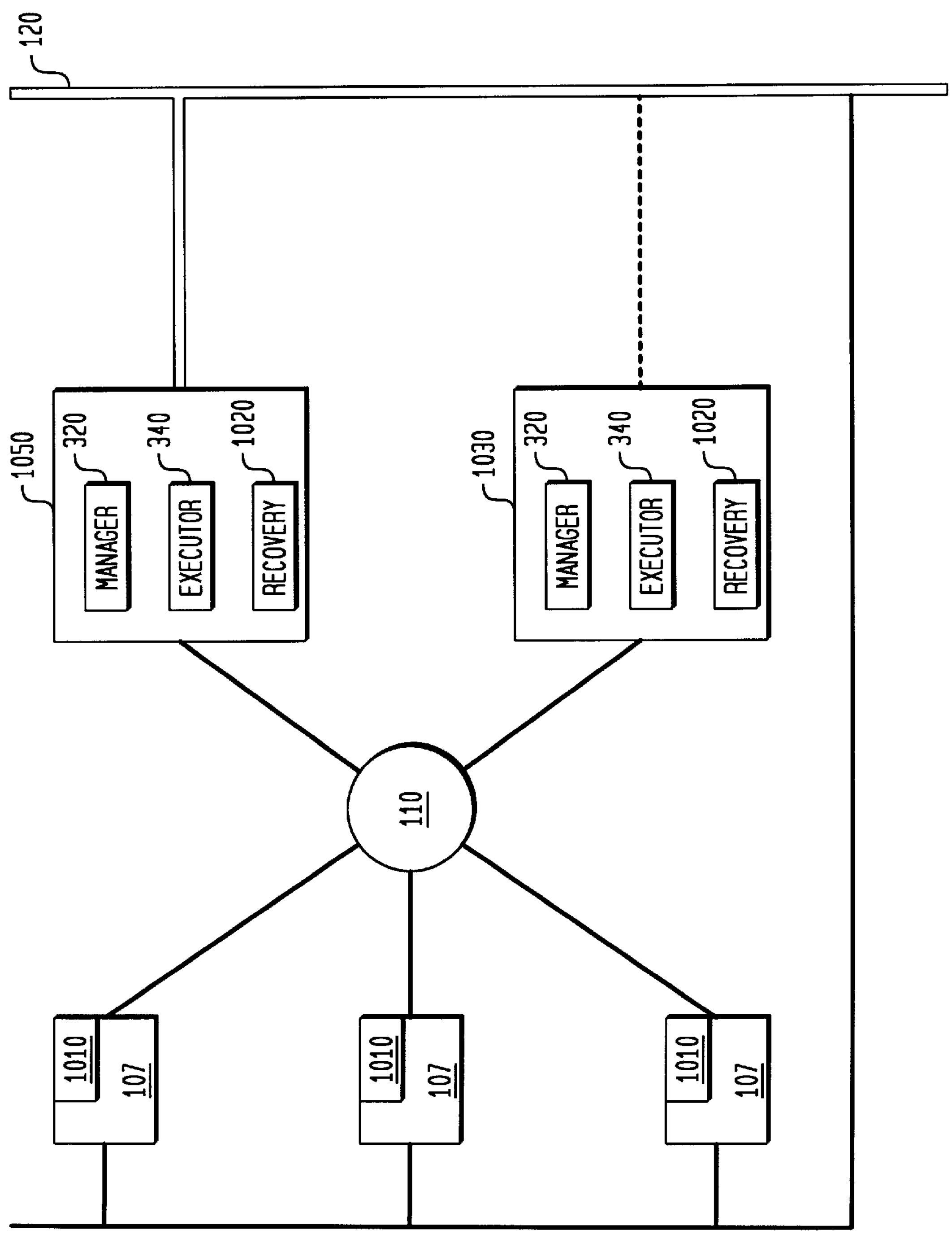
FIG. 10 shows a cluster having a high availability gateway according to an embodiment of the present invention.

FIG. 10 illustrates the configuration of an encapsulated cluster with a highly available Gateway. The primary Gateway 1050 is actively connected to the external network 120. The designated backup Gateway 1030 contains a physical but inactive connection to network 120. In addition to normal Encapsulated Cluster Gateway components Manager 320 and Executor 340, each Gateway contains a Recovery Manager 1020. (The primary Gateway may become the backup after failure and recovery.) Each server node 107 contains a shadow connection table 1010 in which it maintains information about its active connections to the external network 120.

Messages (ip packets) arrive at the cluster gateway, directed to a particular TCP or UDP protocol port. The message switch within the Gateway allows a message routing function to be installed for a protocol port. The routing function is called for each message arriving for the associated port, and is responsible for selecting the internal node and port to which the message is forwarded. Information specifying the established connection and the cluster node holding the connection is recorded in a table in the Gateway; this table is used by the message switch to route incoming packets on established connections to the correct cluster node.

Relatively static information, such as which server ports have installed message switch functions is maintained, and other manager configuration information is kept in a shared file, accessible to both primary and backup Gateway. Current connection information changes very rapidly and is managed according to the techniques described herein.

Each interior node 107 keeps a shadow 1010 of the Gateways routing table for its own connections (not for any connections to other nodes). This shadow table is used by the node to respond to the taking-over Gateway's request from the Recovery Manager 1020 in the backup Gateway 1030 during takeover. This table greatly reduces the amount of time the interior node needs to respond to the taking-over Gateway, and this is very important because, to keep established connections live, the takeover Gateway must be operational within the "time-out" period that the connection-based protocol allows for successful completion of a communication.

To reclaim space for entries in the connection table, both in the Gateway and in the shadow kept at the interior node, we proceed as follows. Connections are either in one of two states, Active or FIN. Connection table entries are time stamped on every reference. A user configurable timer called the FIN_TIME_OUT is kept. This timer represents the point in time after the last reference to a conversation in FIN state that it will be assumed to be closed. The timers can be either global, per service address, or per port. The intent of active close (one side of the connection has sent FIN but the other continues to send on the connection) is that the server would be allowed to continue sending data to a client and at the end of the data transmission the conversation would be closed. The client is allowed to actively close the conversation as a means of telling the server that no further request from the client will be sent. For the purposes of this discussion we will assume that the client's request are being sent through the router. This protocol works because the server continues to send data which will be acked. The router and consequently the server will see the acks and continually time stamp the connection table entries. Once the server completes sending data to the client and closes its "half" of the conversation the final ack will flow to the server from the client. After FIN_TIME_OUT time has elapsed the server can purge the connection entry. A second timer, STALE_TIME_OUT is kept by the Gateway. Any connection which is in Active state with no activity for longer than STALE_TIME_OUT can be purged.

This algorithm (the connection reconstruction algorithm) is executed also in the interior nodes to reclaim space for entries in the shadow of the connection table which the interior node keeps to support the takeover process by the backup Gateway. In this way we keep the number of entries in the shadow tables as small as possible, and this in turn allows the takeover process to proceed as quickly as possible.

As a default the FIN_TIME_OUT should be set to a value which is three times the minimum segment length (MSL) of TCP. The default STALE_TIME_OUT should be longer than TCPs stale time out. More reasonable values for FIN_TIME_OUT can be figured out by taking into account the protocol which the timer is associated with.

When it is decided that the backup Gateway should become active as the Gateway for the cluster, either because the primary has been determined to have failed (by some means not part of this disclosure, but of the type described in (5)) or by an explicit administrative decision, the following steps are taken by the Recovery Manager 1020 in the backup Gateway 1030:

(1) using ip-address takeover as described in (3), the backup Gateway removes the primary Gateway's network connection; this step is required to ensure that the Gateway which is presumed down is in fact prevented from accepting messages from the network. Without this step, it would be possible for a type of failure, i.e., a "partially-failed Gateway" to continue to receive messages and perform processing, which could compromise the integrity of the system.

(2) the backup Gateway interrogates each functioning node of the cluster, requesting descriptions of all UDP ports allocated at the respective node, and TCP connections established through the primary Gateway between itself and hosts outside the cluster; the backup Gateway does this using a private ip-based protocol. The shadow connection table kept in each node allows immediate response from the nodes, increasing the probability that established connections do not time out during Gateway takeover. The algorithm described above for recognizing closed connections and reclaiming the space used to support them minimizes the size of the shadow connection table and contributes to reducing the time required to accomplish Gateway takeover.

(3) the backup Gateway records responses from each functioning node, and records the node's UDP ports and TCP connections in the connection table 510 of FIG. 5 in the backup Gateway's Executor 340 FIG. 10.

(4) when all functioning cluster nodes have responded (nodes which do not respond within a specified time interval are assumed to be not functioning), the backup Gateway enables its own network interface so as to receive packets addressed to the cluster ip-address. This last step completes the work needed to allow the backup Gateway to be operational.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method for providing for routing of a plurality of incoming messages, each message having a message header, across a boundary of a cluster of computer nodes, the cluster coupled to one or more networks and having tables of subsets of said nodes, comprising the steps of:

routing a plurality of messages, wherein said routing comprises, for each message of said plurality of messages:

locating and reading a port number and target address in the message header of a port type message;

based on the target address, selecting a subset of the computer nodes;

based on the port number, selecting a function which determines a routing destination for a message from a plurality of possible destinations in the subset, the routing destination being a computer node in the subset;

sending the message to the routing destination; and while the plurality of messages are being routed across the boundary, dynamically altering at least one of membership in a subset and the number of subsets by manipulating entries in said at least one table.

2. The method of claim 1 wherein the selecting is based on the port number and a protocol identifier in the message header.

3. The method of claim 1 wherein dynamically altering the number of subsets comprises implementing a monitoring function.

4. The method of claim 1 wherein dynamically altering the membership of a subset comprises implementing a monitoring function.

5. The method of claim 3 wherein dynamically altering comprises at least one of substituting members of the subset and adding members to the subset.

6. A gateway for transparently routing incoming messages, each having a message header, across a cluster of computer nodes, each of said nodes having an identifier, wherein said cluster is coupled to one or more networks, comprising:

means for locating and reading a port number and target address in the message header of a port type message and based on the target address, for selecting a subset of the computer nodes;

means for selecting a function based on the port number, wherein the function determines a routing destination for the message from a plurality of possible destinations in the subset, the routing destination being a computer node in the subset;

table means for storing subset entries comprising identifiers of said computer nodes; and automatic means for dynamically altering at least one of membership in a subset and the number of subsets by manipulating entries in said tables during message routing.

7. The system of claim 6 wherein the number of subsets is dynamically altered by a monitoring function.

8. The system of claim 7 wherein the membership of a subset is dynamically altered by the monitoring function.

9. The system of claim 7 wherein the altering comprises at least one of substituting members of the subset and adding members to the subset.

10. A method for routing incoming messages each having a message header across a boundary node of a cluster of computer nodes, the cluster connected to one or more networks, comprising the steps of:

at the boundary node:

locating and reading a port number in the message header of a port type message;

based on the port numbers selecting a function which determines a routing destination for the message from a plurality of possible destinations, the routing destination being a computer node in the cluster;

detecting a failure of the boundary node;

in response to detection of the failure, transferring subsets of state information from each node in the cluster to an alternate boundary node;

at the alternate boundary node:

collecting the subsets of the state information from the nodes in the cluster; and, using the state information to reconstruct an operating state of the boundary node prior to failure such that messages are distributed by the alternate boundary node in the same manner as would have been accomplished by the boundary node prior to failure.

11. The method of claim 10 comprising the further steps of:

locating and reading a port number and target address in the message header of a port type message;

based on the target address, selecting a subset of the computer nodes, wherein the routing destination is selected from only the subset.

* * * * *